US006802474B2

(12) United States Patent
Sonoda et al.

(10) Patent No.: US 6,802,474 B2
(45) Date of Patent: Oct. 12, 2004

(54) ADVANCED HIGH TURNING COMPRESSOR AIRFOILS

(75) Inventors: Toyotaka Sonoda, Wako (JP);
Toshiyuki Arima, Wako (JP);
Yoshihiro Yamaguchi, Wako (JP);
Markus Olhofer, Seligenstadt (DE)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/410,215

(22) Filed: Apr. 10, 2003

(65) Prior Publication Data

US 2004/0075026 A1 Apr. 22, 2004

(30) Foreign Application Priority Data

Oct. 8, 2002 (DE) .......................................... 102 46 814

(51) Int. Cl.$^7$ ................................................. B64C 3/00
(52) U.S. Cl. ............... 244/35 R; 244/35 A; 416/223 R; 416/242; 416/225
(58) Field of Search ........................... 244/35 R, 35 A, 244/53 R; 416/223 R, 242, 225

(56) References Cited

U.S. PATENT DOCUMENTS

| 4,655,412 | A |   | 4/1987 | Hinkleman ............... 244/35 R |
| 6,331,100 | B1 | * | 12/2001 | Liu et al. ..................... 416/238 |
| 6,361,279 | B1 | * | 3/2002 | Rodde et al. ........... 416/223 R |
| 6,527,510 | B2 | * | 3/2003 | Olhofer et al. ............. 415/191 |
| 6,638,021 | B2 | * | 10/2003 | Olhofer et al. ............. 416/242 |
| 6,666,654 | B2 | * | 12/2003 | Olhofer et al. ............. 416/228 |

FOREIGN PATENT DOCUMENTS

JP         2906939 B2    4/1999

* cited by examiner

Primary Examiner—J. Woodrow Eldred
(74) Attorney, Agent, or Firm—Birch, Stewart, Kolasch & Birch, LLP

(57) ABSTRACT

In a high turning airfoil capable of being suitably applied to each of blades constituting a blade row of an axial flow-type compressor, both of an intrados generating a positive pressure and an extrados generating a negative pressure exist on one side of a chord line, and the curvature of the extrados made non-dimensional by a chord length has a maximum value between a position corresponding to 10% of the chord length and a position corresponding to 35% of the chord length, and a minimum value in the rear of the position of the maximum value and between a position corresponding to 30% of the chord length and a position corresponding to 50% of the chord length. Preferably, a difference between the maximum value and the minimum value of the curvature is equal to or larger than 0.5, and a turning angle is equal to or larger than 40°. With this airfoil, the total pressure loss coefficient is decreased more than that in an airfoil according to a comparative example in the entire Reynolds number region including medium and high Reynolds number regions and particularly, is decreased remarkably more than that in the airfoil according to the comparative example in a region of low Reynolds number equal to or smaller than 130,000. This is considered because a laminar flow separation region on the extrados of the airfoil is small in the low Reynolds number region, and a phenomenon of reverse flow within bubbles in the laminar flow separation region is weakened.

3 Claims, 6 Drawing Sheets

ADVANCED HIGH TURNING COMPRESSOR AIRFOILS

BACKGROUND OF THE INVENTION

1. Field of the Invention

The present invention relates to an airfoil of each of blades constituting a compressor blade row, and particularly to a high turning airfoil in a compressor in which both of an intrados generating a positive pressure and an extrados generating a negative pressure exist on one side of a chord line.

2. Description of the Related Art

An airfoil for an airplane described in U.S. Pat. No. 4,655,412 has a feature in a distribution of curvature of an extrados thereof. The curvature has a first minimum value at a position in front of a position corresponding to 10% of a chord length; a second minimum value at a position in the rear of the position of the maximum value and in front of a position corresponding to 40% of the chord length, and a maximum value at a position intermediate between the first and second minimum values, whereby an enhancement in dynamic lift characteristic and an enhancement in load balance at a large elevation angle are provided by such distribution of curvature.

In an airfoil for a stator blade or a rotor blade of an axial flow compressor described in Japanese Patent No. 2,906,939, the curvature of an extrados has a minimum value at a position in the rear of a leading edge and a maximum value at a position in the further rear of the leading edge. Therefore, the generation of a shock wave is avoided in an inlet speed region from a high subsonic speed to a supersonic speed of the axial flow compressor, whereby a decrease in loss due to the shock wave is achieved.

The airfoil described in U.S. Pat. No. 4,655,412 is one for an airplane having a small turning angle and is difficult to be applied to a blade of a high turning axial flow compressor. The airfoil described Japanese Patent No. 2,906,939 is used for an axial flow compressor, but is of a low-turning type having an intrados and extrados existing on opposite sides of a blade chord line, and is basically different from an airfoil according to the present invention in which an intrados and extrados exist on one side of a blade chord line. In addition, in the airfoil described Japanese Patent No. 2,906,939, the curvature of the extrados has the maximum value in the rear of the minimum value, that is, the positional relationship between the maximum and minimum values is opposite from that in the airfoil according to the present invention in which the curvature of the extrados has the maximum value within a region from 10% to 35% of the chord length and the minimum value within a region from 30% to 50% of the chord length in the rear of the maximum value.

SUMMARY OF THE INVENTION

The present invention has been accomplished with the above circumstance in view, and it is an object of the present invention to provide a high turning compressor airfoil, wherein a laminar flow separation and the generation of bubbles particularly in a low Reynolds number region can be suppressed to reduce the relative total pressure loss, while maintaining a performance in medium and high Reynolds number regions.

To achieve the above object, according to a first feature of the present invention, there is proposed an advanced high turning compressor airfoil, in which both of an intrados generating a positive pressure and an extrados generating a negative pressure exist on one side of a blade chord line, wherein the curvature of the extrados made non-dimensional by a chord length has a maximum value between a position corresponding to 10% of the chord length and a position corresponding to 35% of the chord length, and a minimum value in the rear of the maximum value and between a position corresponding to 30% of the chord length and a position corresponding to 50% of the chord length.

According to a second feature of the present invention, in addition to the first feature, a difference between the maximum value and the minimum value of the curvature of the extrados is equal to or larger than 0.5.

According to a third feature of the present invention, in addition to the first feature, a turning angle is equal to or larger than 40°.

With above features, the curvature of the extrados of the high turning airfoil for the compressor in which the intrados generating the positive pressure and the extrados generating the negative pressure exist on one side of the chord line, has the maximum value between the position corresponding to 10% of the chord length and the position corresponding to 35% of the chord length, and the minimum value in the rear of the position of the maximum value and between the position corresponding to 30% of the chord length and the position corresponding to 50% of the chord length. Therefore, it is possible to suppress a laminar flow separation and the generation of bubbles in a low Reynolds number region to decrease the relative total pressure loss remarkably, without deteriorating the performance in medium and high Reynolds number regions.

Especially, the above effect can be exhibited further remarkably by setting the difference between the maximum and minimum values of the curvature of the extrados of the airfoil at 0.5 or more, or by setting the turning angle at 40° or more.

The term "curvature" used in this specification indicates one made non-dimensional by the chord length C. Namely, the curvature is an inverse number of a radius of curvature, but the radius of curvature is made non-dimensional by the chord length C. Therefore, if an actual radius of curvature is equal to the chord length C, the non-dimensional radius of curvature is 1.0, and the curvature is 1.0. If the actual radius of curvature is two times the chord length C, the non-dimensional radius of curvature is 2.0, and the curvature is 0.5. If the actual radius of curvature is one half of the chord length C, the non-dimensional radius of curvature is 0.5, and the curvature is 2.0.

The above and other objects, features and advantages of the invention will become apparent from the following description of the preferred embodiment taken in conjunction with the accompanying drawings.

DESCRIPTION OF THE PREFERRED EMBODIMENTS

The present invention will now be described by way of embodiments with reference to FIGS. 1 to 6.

Figure 1:
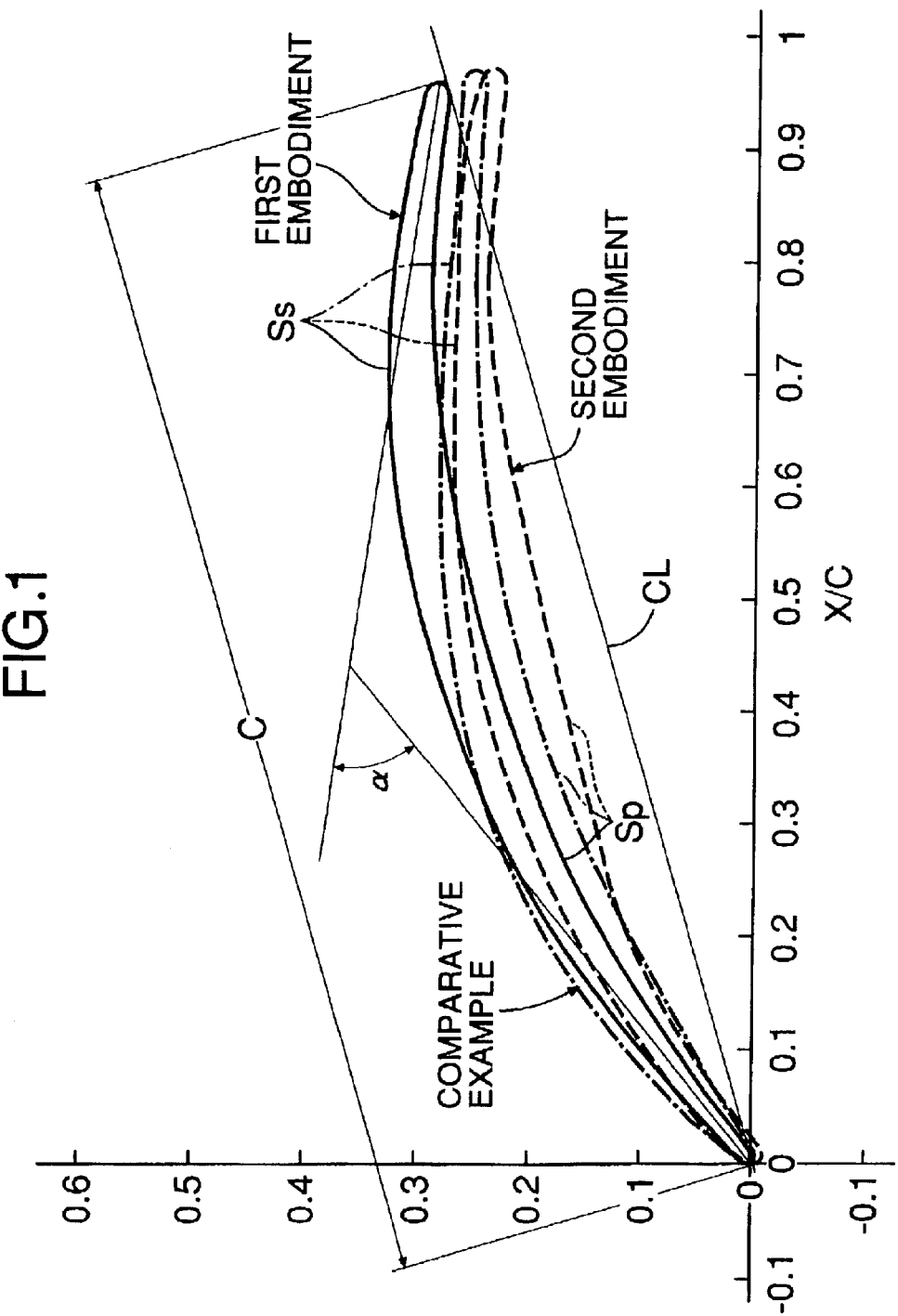
FIG. 1 is a diagram showing an airfoil according to a first embodiment, an airfoil according to a second embodiment and an airfoil according to a comparative example.
Figure 2:
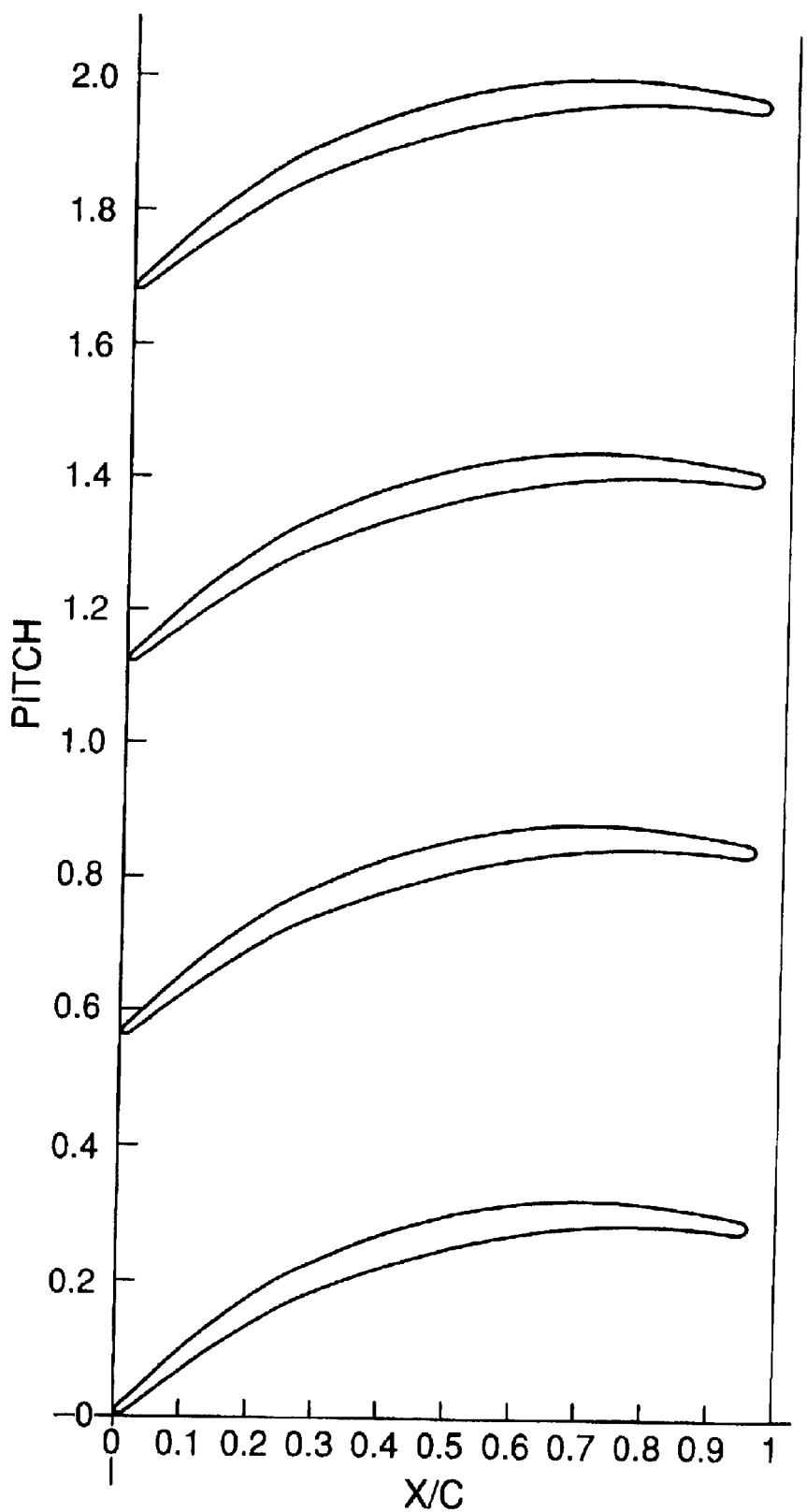
FIG. 2 is a diagram showing a blade cascade according to the first embodiment.
Figure 3:
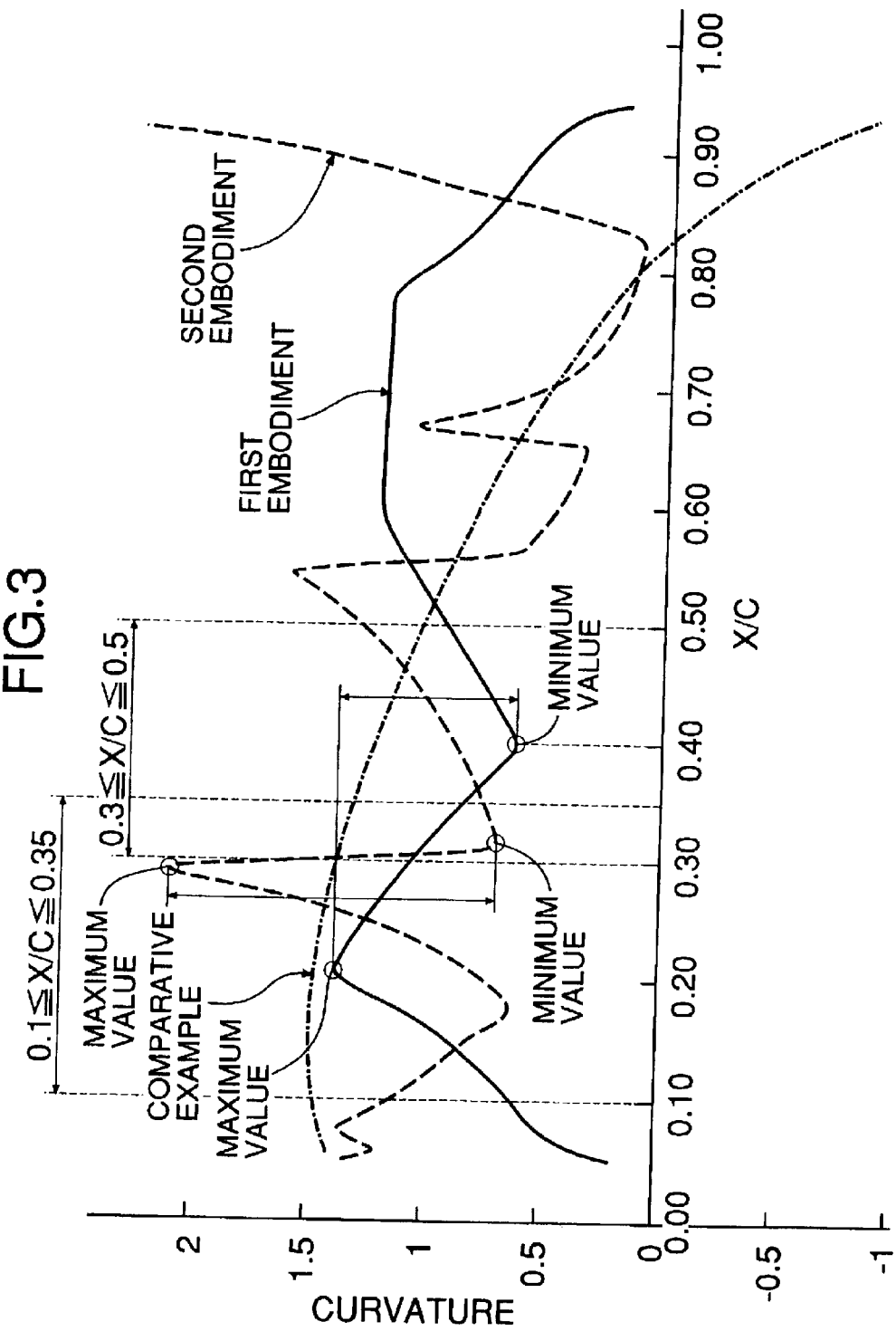
FIG. 3 is a graph showing chord-wise distributions of curvatures of extradoses of the airfoils according to the first and second embodiments and the comparative example.
Figure 4:
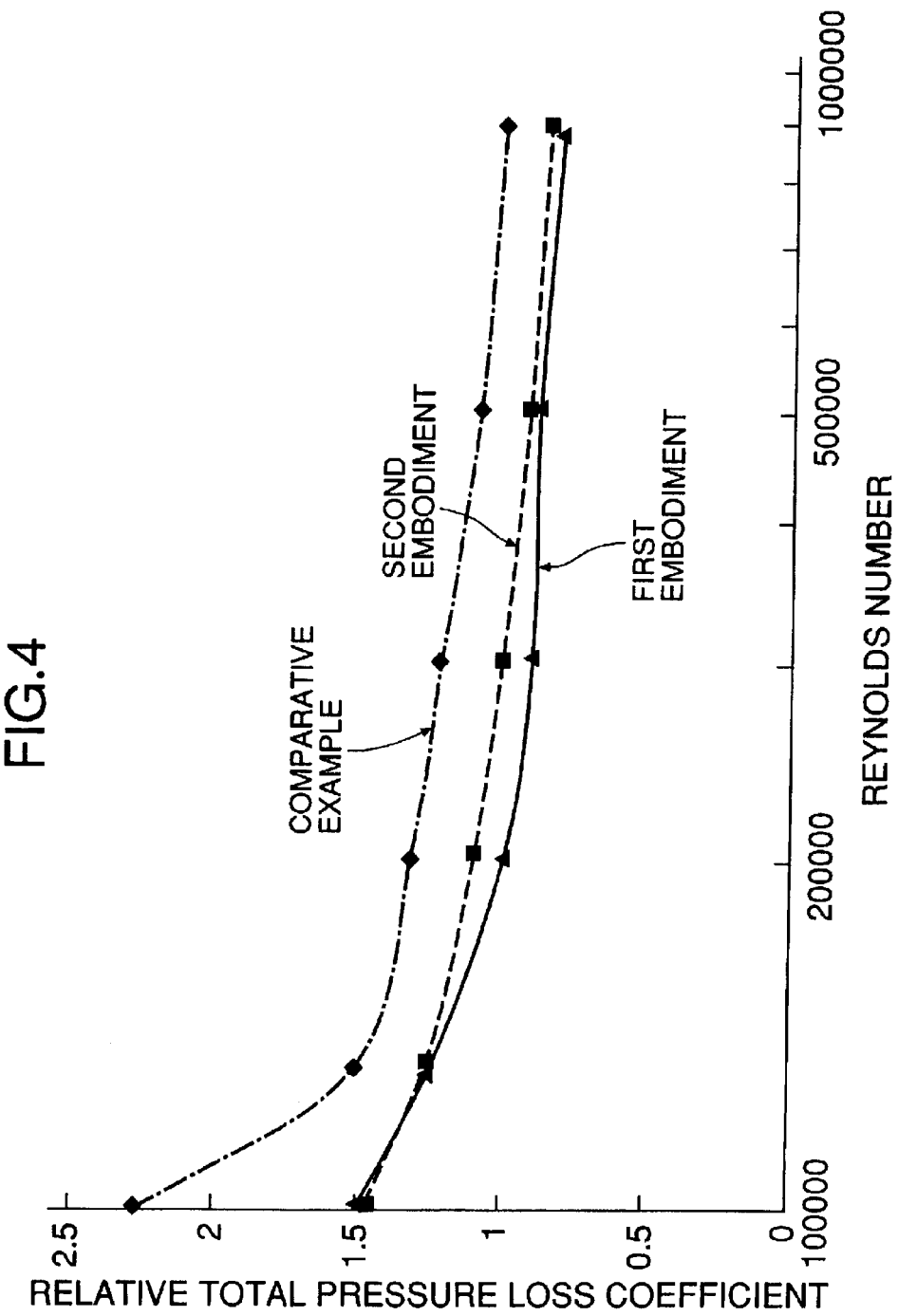
FIG. 4 is a graph showing influences exerted to the relative total pressure loss coefficients of the airfoils according to the first and second embodiments and the comparative example.

An air foil according to a first embodiment of the present invention is shown by a solid line in FIG. 1; an airfoil according to a second embodiment of the present invention is shown by a broken line in FIG. 1; and an airfoil according to a comparative example (a conventional control diffusion airfoil) is shown by a dashed line in FIG. 1. These airfoils are used for a blade row of an axial flow compressor (see FIG. 2). The airfoil according to each of the first and second embodiments is of a high-turning type in which an intrados (a pressure surface) Sp and an extrados (a suction surface) Ss exist on one side of a chord line CL, and a turning angle α is equal to or larger than 40° (43° in the airfoil according to the first embodiment) As can be seen from FIG. 3, a curvature of the extrados Ss of the airfoil according to the comparative example is decreased monotonously from a leading edge toward a trailing edge, and assumes a negative value at a position rearwards from 83% of a chord length C (the shape of the extrados Ss is recessed upwards). By smoothly varying the curvature of the extrados Ss of the airfoil in the above manner, a fluid flowing along the extrados Ss is decelerated effectively to recover the pressure and to prevent the occurrence of a flow separation. However, the airfoil according to the comparative example suffers from a problem that a relative total pressure loss coefficient is higher in a wide Reynolds number region, and particularly, is increased steeply in a region of lower Reynolds number equal or lower than 130,000, as can be seen from FIG. 4.

On the other hand, in the airfoil (see the solid line) according to the first embodiment, the curvature of the extrados Ss assumes a maximum value (1.37) at a position corresponding to 21% of the chord length C, and a minimum value (0.63) at a position in the rear of the position of the maximum value and corresponding to 40% of the chord length C. In the airfoil (see the broken line) according to the second embodiment, the curvature of the extrados Ss assumes a maximum value (2.12) at a position corresponding to 29% of the chord length C, and a minimum value (0.73) at a position in the rear of the position of the maximum value and corresponding to 32% of the chord length C. A difference between the maximum value and the minimum value of the curvature of the extrados Ss is 0.74 in the airfoil according to the first embodiment and 1.39 in the second embodiment. The differences in both the first and second embodiments exceed 0.50.

If the curvature assumes the maximum value between the position corresponding to 10% and the position corresponding to 35% of the chord length C as well as the minimum value between the rear position corresponding to 30% and the rear position corresponding to 50% of the chord length C as described above, the relative total pressure loss coefficient in each of the embodiments is lower than that in the airfoil according to the comparative example in a region of all Reynolds numbers including regions of medium and higher Reynolds numbers, and remarkably lower than that in the airfoil according to the comparative example particularly in the region of lower Reynolds number equal to or lower than 130,000. The above-described effect is particularly remarkable when the turning angle α of the airfoil is equal to or larger than 40° and the difference between the maximum and minimum values of the curvature is equal to or larger than 0.50.

Figure 5:
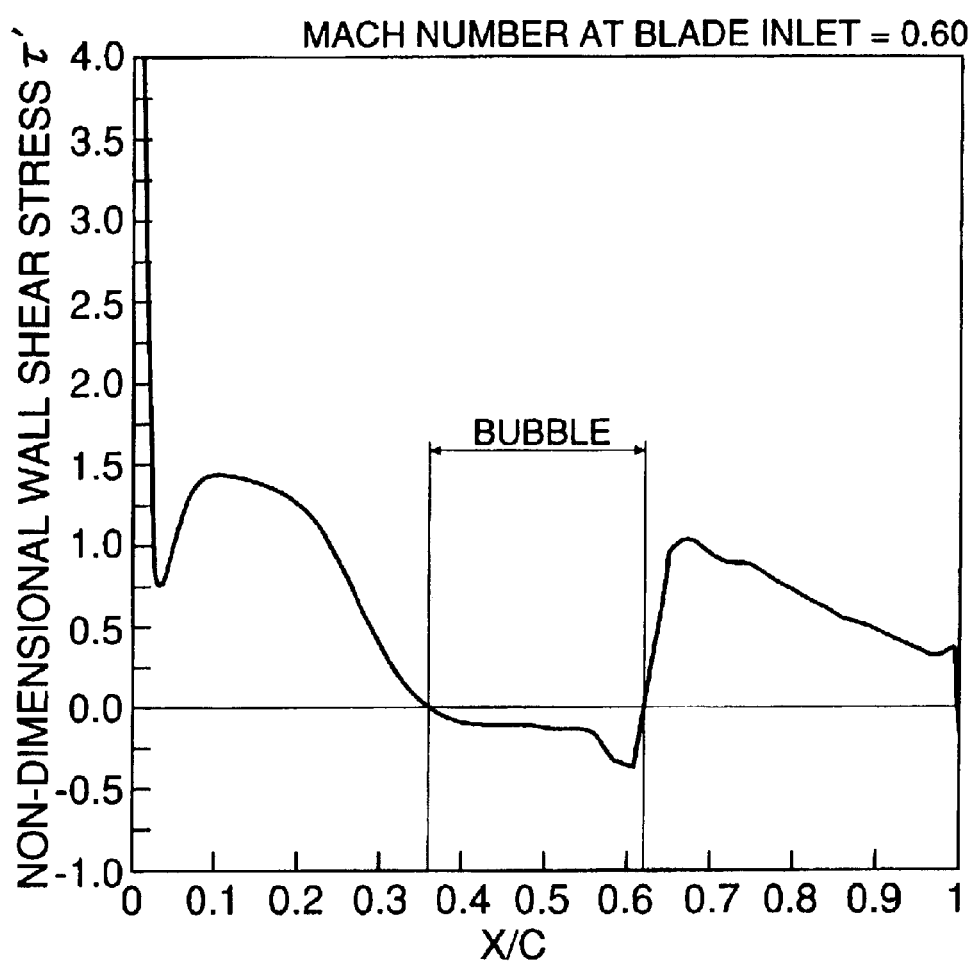
FIG. 5 is a graph showing a distribution of wall shear stress at Mach number 0.60 at the blade inlet in the extrados according to the first embodiment.
Figure 6:
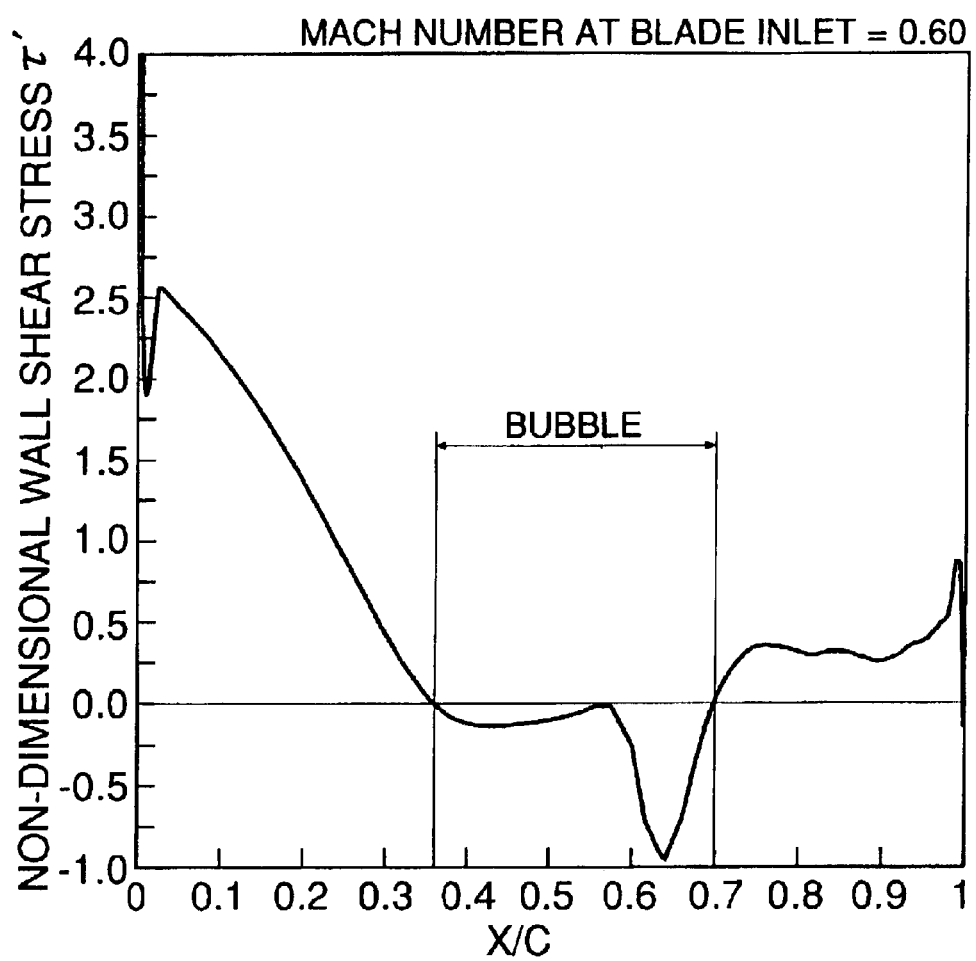
FIG. 6 is a graph showing a distribution of wall shear stress at Mach number 0.60 at the blade inlet in the extrados according to the comparative example.

A region where a non-dimensional wall shear stress in the extrados Ss of the airfoil according to the comparative example assumes a negative value, namely a region where bubbles are generated due to a laminar flow separation, extends from a position corresponding to 36% of the chord length C to a position corresponding to 70% of the chord length C, as shown in FIG. 6. However, a region where a non-dimensional wall shear stress in the extrados Ss of the airfoil according to the first embodiment assumes a negative value, namely a region where bubbles are generated due to the laminar flow separation, extends from a position corresponding to 36% of the chord length C to a position corresponding to 62% of the chord length C, as shown in FIG. 5. That is, in the airfoil according to the first embodiment, the size of a laminar flow separation region is decreased by 8% of the chord length C because the re-attached position of a boundary layer has been displaced forwards. Moreover, it can be seen that the degree of the negative value of the non-dimensional wall shear stress in the laminar flow separation region is weaker in the airfoil according to the first embodiment than that in the airfoil according to the comparative example, and a phenomenon of reverse flow of the fluid in the bubbles in the laminar flow separation region is alleviated in the airfoil according to the first embodiment. In this way, with the airfoil according to the first embodiment, the laminar flow separation on the extrados Ss and the generation of the bubbles are suppressed effectively. This is considered to be a factor to decrease the relative total pressure loss coefficient.

If a viscosity coefficient is represented by $\mu$; a distance from a wall surface is represented by y; and a velocity of a component of a speed parallel to the wall surface at a position spaced at the distance y apart from the wall surface is represented by U, the wall shear stress $\tau$ is represented by $\tau=\mu(dU/dy)$. The non-dimensional wall shear stress $\tau'$ in each of FIGS. 5 and 6 is one provided by making the above-described wall shear stress $\tau$ non-dimensional using a reference speed Uref and a reference density $\rho$, and is represented by $\tau'=\tau/(\rho Uref**2)$.

Although the embodiments of the present invention have been described in detail, it will be understood that the present invention is not limited to the above-described embodiments, and various modifications in design may be made without departing from the spirit and scope of the invention defined in the claims.

What is claimed is:

1. An advanced high turning compressor airfoil of each of blades constituting a compressor blade row, in which both of an intrados generating a positive pressure and an extrados generating a negative pressure exist on one side of a blade chord line, wherein the curvature of the extrados made non-dimensional by a chord length has a maximum value between a position corresponding to 10% of the chord length and a position corresponding to 35% of the chord length, and a minimum value in the rear of said maximum value and between a position corresponding to 30% of the chord length and a position corresponding to 50% of the chord length.

2. An advanced high turning compressor airfoil according to claim 1, wherein a difference between the maximum value and the minimum value of the curvature of said extrados is equal to or larger than 0.5.

3. An advanced high turning compressor airfoil according to claim 1, wherein a turning angle is equal to or larger than 40°.

* * * * *